Figure 1:
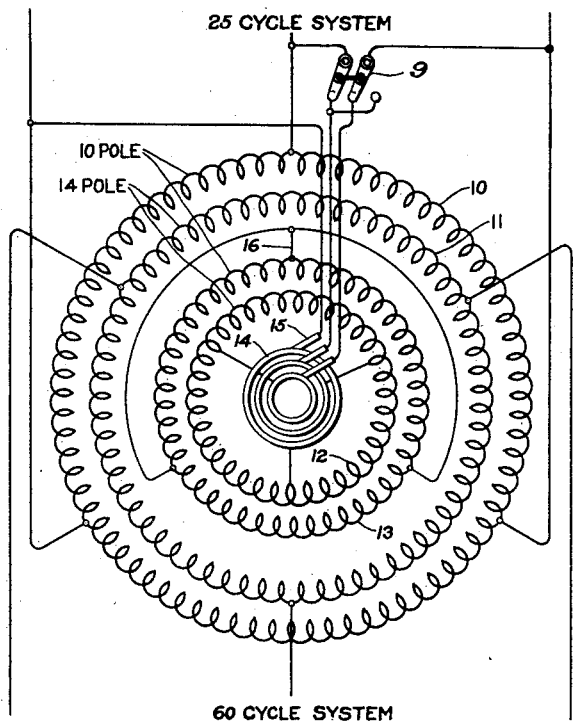

Oct. 27, 1925.    1,559,103

J. I. HULL

FREQUENCY CHANGER

Filed Feb. 9, 1924    2 Sheets-Sheet 1

Inventor:
John I. Hull.
by
His Attorney.

Oct. 27, 1925.
J. I. HULL
1,559,103
FREQUENCY CHANGER
Filed Feb. 9, 1924    2 Sheets-Sheet 2
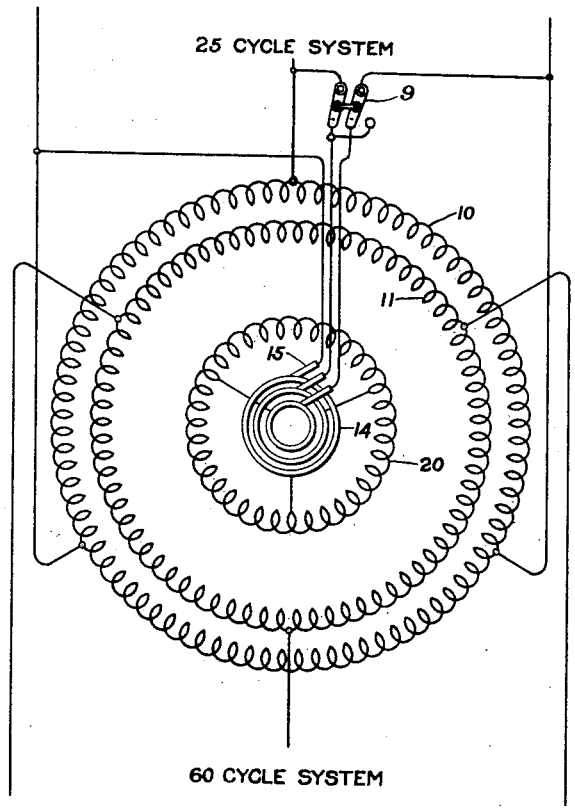
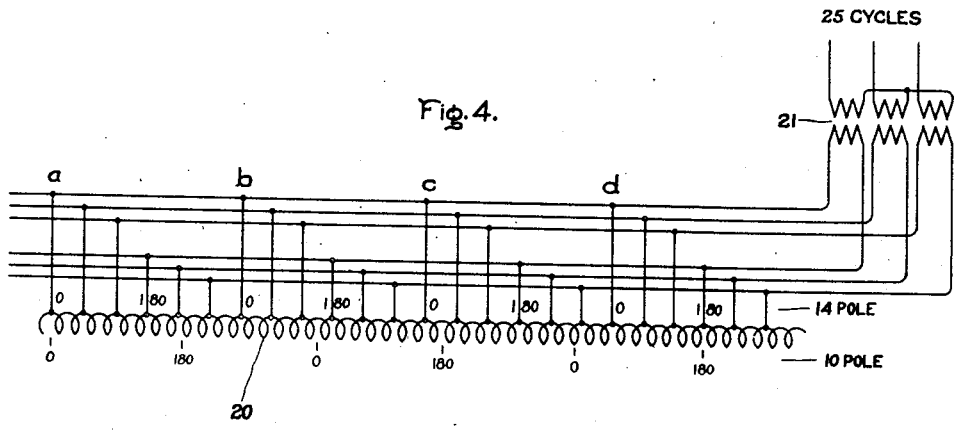
Inventor:
John I. Hull.
by *Alexander D. Lunt*
His Attorney.

Patented Oct. 27, 1925.

1,559,103

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

FREQUENCY CHANGER.

Application filed February 9, 1924. Serial No. 691,794.

*To all whom it may concern:*

Be it known that I, JOHN I. HULL, a citizen of the United States, residing at Schenectady, in the county of Schenectady, State of New York, have invented certain new and useful Improvements in Frequency Changers, of which the following is a specification.

My invention relates to rotary frequency changers and in particular to such a frequency changer built as a single machine.

The usual type of frequency changer transferring from approximately or exactly one standard frequency to approximately or exactly another standard frequency, for example 25 and 60 cycles, involves the use of a motor operating on one of the frequencies and a generator on the other frequency. These machines may both be synchronous machines, both induction machines, or one of each. Each machine carries the entire energy and the two are mechanically coupled so that they rotate at the same mechanical speed but are provided with different numbers of poles suited to the frequencies upon which they are designed to run. Another type of frequency changer is described in Steinmetz Patent No. 620,990 and comprises a synchronous dynamo electric machine mechanically connected to a dynamo electric machine of the wound secondary induction type. The speed and polar relations of the two machines can be made such that when the synchronous machine is connected to and is running synchronously from one system, it drives one member of the induction machine relative to the other member at the correct speed to permit the primary and secondary windings thereof to be connected as a transformer between the two systems. Such a machine, when correctly designed and proportioned, with relation to the capacities of the interconnected systems, constitutes a frequency and voltage tie between the systems, as is described and claimed in an application filed March 30, 1923, Serial No. 628,886, Theophilus F. Barton, entitled "System of distribution," assigned to the same assignee as the present application.

The frequency changer which is the subject of the present application may be likened to combining the elements of the Steinmetz frequency converter into a single mechanical structure, at the same time arranging matters so that direct current excitation is no longer required.

The features of my invention which I believe to be novel and patentable will be pointed out in the claims appended hereto. For a better understanding of my invention, reference is made in the following description to the accompanying drawings in which Figs. 1 and 3 represent the windings and circuit connections of different modifications of my invention, and Figs. 2 and 4 represent partial detail winding diagrams for the machines of Figs. 1 and 3 respectively.

In order to illustrate the practical advantages of my invention, certain definite phase numbers, frequencies and pole numbers are hereinafter mentioned, but it is not intended to limit the invention in this respect.

Referring now to Fig. 1, I have represented windings 10 and 11 respectively connected to 25 and 60 cycle systems. These windings represent distributed alternating current 3-phase windings wound on a common stator member. The winding 10 is a 10-pole winding and the winding 11, a 14-pole winding. The rotor also has two distributed 3-phase windings, namely, a 14-pole winding 12 connected to the 25 cycle system through slip rings 14 and brushes 15, and a 10-pole winding 13, short circuited on itself as indicated at 16. Stator windings 10 and 11 are wound so as to be non-inductive with respect to each other and likewise, rotor windings 12 and 13 are wound to be non-inductive with respect to each other.

Figure 2:
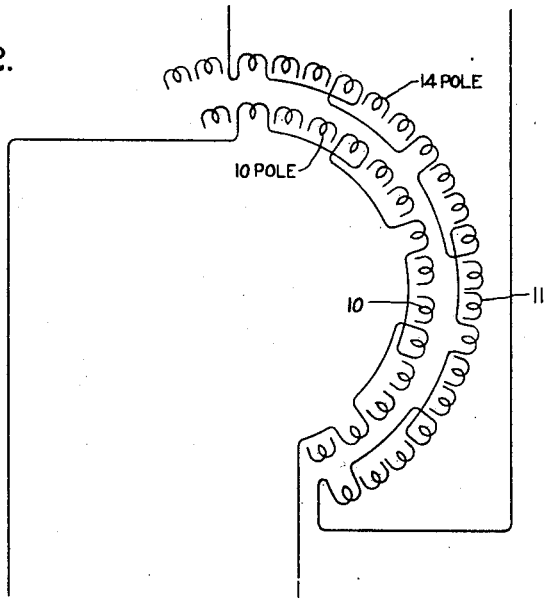

In Fig. 2 I have represented a partial detail wiring diagram showing one way in which the non-inductive relation of the windings may be carried out. In this figure, half of the connections for one phase of a 3-phase, 2-circuit, 14-pole winding 11 are drawn in and half of the connections for one phase of a 3-phase, 2-circuit, 10-pole winding 10 are drawn in. It will be readily understood that a 10-pole flux will induce no resultant voltage between the terminals of the phase drawn in for the winding 11 because each of its seven coils has an electromotive force induced in it by the 10-pole flux differing in phase from the next series connected coil by 360/7 electrical degrees, so that the resultant induced electromotive force is zero. Similarly, a 14-pole flux will induce no resultant voltage across the terminals of the 10-pole winding circuit if arranged as represented in the drawing. Other arrangements of the windings may be made to accomplish the same result. The same explanation refers to the windings of the rotor.

The functioning of such a machine when used as a frequency converter between 25 and 60 cycle systems may be explained as follows: Windings 10 and 13 considered by themselves constitute the windings of a 10-pole induction machine which will therefore operate at approximately synchronous speed for 10 poles and 25 cycles, or 300 R. P. M. plus or minus the natural induction motor slip accordingly as the induction element of the machine operates as a generator or a motor. The rotor winding 12 by virtue of its connection sets up a revolving field of 14 poles. If the direction of rotation of this field with respect to the rotor is made the same as that of the mechanical rotation of the rotor, the speed in space of the revolving 14-pole flux will be the sum of the speed of the mechanical rotation plus the speed corresponding to 14 poles and 25 cycles which is 214 R. P. M. This sum is obviously equivalent to 514 R. P. M. plus or minus the slip of the induction element of the machine. Now, the winding 11 is a 14-pole winding and inasmuch as 514 R. P. M. is the 60 cycle synchronous speed for 14 poles, it is apparent that the stator winding 11 will have induced in it by the flux set up by the rotor winding 12 an electromotive force equal to approximately 60 cycles and the winding 11 may therefore be synchronized with and connected to the 60 cycle system. Since the winding 11 has been made non-inductive with respect to 10 poles, no electromotive force will be apparent at its terminals, due to the 10-pole flux.

It is also conceivable that if the phase rotation of winding 12 is made opposite to that of the mechanical rotation as by means of the reversing switch 9, it will induce a rotating magnetic field in winding 11 equal to the difference of the mechanical rotation and that of the revolving field of winding 12 whereby a different ratio of frequency transformation may be had. Thus, in the example given, the difference between the mechanical rotation of 300 R. P. M. and that of the rotating field of winding 13, which is 214 R. P. M. is 86 R. P. M. which would produce a frequency in winding 11 of 10⅓ cycles having the same phase rotation as before. Thus the 25—60 cycle converter may be changed to a 25—10⅓ cycle converter by merely interchanging two of the leads to brushes 15 of Fig. 1.

Energy may be transferred from one system to the other, the winding 11 carrying all of the energy on the 60 cycle side which may be considered to be equal to 2.4 units. Winding 10 will carry 1.4 units of the energy on the 25 cycle side by induction motor or induction generator action, while windings 12 and 13 will carry the other units of energy on the 25 cycle side by transformer action. In this discussion the losses in the machine have not been considered. Such a machine will obviously transfer power in either direction. If the 60 cycle system frequency is slightly above normal, power will be transferred therefrom to the 25 cycle system, and if the 25 cycle system frequency is slightly above normal with normal frequency on the 60 cycle system, the transfer of power will be toward the 60 cycle system, while if both frequencies are exactly or proportionally correct, there will be no transfer of power.

Not all 10-pole and 14-pole windings will be non-inductive toward one another, so that due care should be exercised in properly disposing them, selecting the number of circuits and the connections to achieve the desired result. Other combinations of poles bearing the relation of N and 1.4N may be used for 25 to 60 cycle conversion and when the two systems are of other frequencies, for example 60 and 50 cycles, or 60 and 40 cycles, other ratios of pole numbers must be used.

It will be found that where the direction of rotation of the field of winding 12 is made the same as the mechanical rotation the ratio of poles to be used in any particular case can be expressed as follows, where N equals the number of poles of windings 11 and 12, N′ equals the number of poles of windings 10 and 13, C′ equals the frequency of the system connected to 11 and C the frequency of the system connected to windings 10 and 12,—

$$N' = N\left\{\frac{C'}{C} - 1\right\}$$

Thus if C′ equals 60 and C equals 25, we have N′ equaling 1.4N, and if C′ equals 60 and C equals 40, we have N′ equaling .5N, etc.

It will also be apparent that care should be taken in disposing the windings of the different pole numbers so that a fairly accurate balance of mechanical forces is secured. That is to say, the magnetic pull at right angles to the rotor shaft should be substantially balanced in all directions, so that there is no tendency to bend the shaft and cause a non-symmetrical air gap between rotor and stator. It has been found that if the difference in the number of poles in the two unequal pole windings be made equal to 4, 8, 12, 16, etc., the danger of unbalancing is avoided. Thus, in general, the invention is applicable where non-inductive windings having the desired pole number ratio are arranged to avoid mechanical unbalancing between rotor and stator.

Instead of having two rotor windings, as illustrated in Fig. 1, it is possible to combine them into a single rotor winding, arranged to have two inductively non-interfering circuits of the desired pole numbers, as illustrated in Figs. 3 and 4. In Fig. 3 the stator windings 10 and 11 are in all respects similar to the stator windings illustrated in Fig. 1 and are similarly connected to the two alternating current systems which, for the sake of simplicity, will be considered to be 25 and 60 cycle systems. The single rotor winding 20 will be made for 14 poles and connected to the 25 cycle system like the winding 12 of Fig. 1. It will, however, be made so as to have a 10 pole current path or circuit in addition to the 14 pole circuit which two circuits will be non-inductively arranged with respect to each other. Thus connections which are used for multiple circuits and the like for the 14-pole winding may serve as short circuit paths for the 10 pole function. In many cases it will be desirable to interpose a transformer between the 25 cycles power supply and the rotor winding 20 to obviate mechanical difficulties in designing the winding 20 for exactly the correct voltage and further, to obviate the difficulty of handling a high potential on slip rings 14.

There will be cases where the proper connections of such transformers will facilitate harmonizing the two distinct functions of the combined 14 and 10 pole winding 20. Such an arrangement is represented in Fig. 4 where a portion of the winding 20 is shown developed and connected to the 25 cycle system through a transformer 21, the slip rings between winding 20 and transformer 21 being omitted for the sake of simplicity. In the particular arrangement shown, the winding 20 is represented as a lap winding forming a continuous circuit as in the rotor of a direct current machine. The 14 pole-effect is obtained by the system of connections shown. I have indicated the zero and 180 electrical degree point for the 14-pole winding and likewise for the 10-pole winding, carrying this out for 7 poles of the 14-pole winding and 5 poles of the 10-pole winding. It will be seen that a certain phase connection is tapped in at points $a$, $b$, $c$, $d$, etc., for the 14-pole winding. For the 10-pole winding, positions $a$ and $c$ are approximately 153 electrical degrees out of phase so that it will be apparent that the 14-pole circuit is highly non-inductive toward the 10-pole circuit by reason of these connections.

The operation of the frequency converter shown in Fig. 3 is in other respects similar to that described in connection with Fig. 1. Other systems of connection and pole numbers may be used to accomplish the desired results and the pole number ratio to be selected in any given case will depend upon the frequency relations of the two interconnected systems in the same manner as explained in Fig. 1.

By my improvement a frequency converter may thus be built as a single machine eliminating a stator and a rotor magnet structure, a long shaft and the extra bearings and bearing pedestals necessary where two separate machines are used. My improved frequency converter may be used with a speed regulating set, as described in Gilt application, Serial No. 638,756 filed May 14, 1923, assigned to the same assignee as the present application, so that the flow of energy from one system to the other may be controlled at will and not be dependent upon adjusting the frequencies as is usually the case. All of the equilavent excitation required of the set can, if desired, be supplied through the winding 13 of Fig. 1 by means of the usual type of phase advancer.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other arrangements.

What I claim as new and desire to secure by Letters Patent of the United States, is:

1. A frequency changer comprising a stator member provided with two alternating current windings arranged to be inductively noninterfering with respect to each other and having pole numbers of a difference equal to 4 or a multiple thereof, and a cooperating rotor member provided with a winding system having two alternating current circuits with pole numbers respectively equal to the pole numbers of the stator windings and arranged to be similarly noninterfering, one of said rotor circuits being closed in a manner to enable the same to function as the secondary of an induction machine and the other rotor circuit having a power connection with the stator winding of unlike pole number.

2. A frequency changer comprising a primary member provided with two alternating current windings arranged to be inductively noninterfering with respect to each other and having pole numbers of a difference equal to 4 or a multiple thereof and a cooperating secondary member which is relatively rotatable with respect to the primary member provided with a winding system having two alternating current circuits with pole numbers respectively equal to the pole numbers of the winding of the primary member and arranged to be similarly noninterfering, one of said circuits being closed in a manner to enable the same to function as an induction machine secondary and the other circuit having a power connection with the primary winding of unlike pole member.

3. A frequency changer comprising a primary member provided with two polyphase windings arranged to be inductively noninterfering with respect to each other and having pole numbers of a difference equal to 4 or a multiple thereof and a cooperating relatively rotatable secondary member provided with a winding system having two polyphase circuits with pole numbers respectively equal to the pole numbers of the primary windings and arranged to be similarly noninterfering, one of said circuits being closed in a manner to enable the same to function as the secondary of an induction machine and the other circuit having a polyphase power connection with the primary winding of unlike pole number.

4. A frequency changer comprising a primary member provided with two polyphase windings arranged to be inductively noninterfering with respect to each other and having different pole numbers and a cooperating relatively rotatable secondary member provided with a winding system having two polyphase circuits with pole numbers respectively equal to the pole numbers of the primary windings and arranged to be similarly noninterfering, one of said circuits being closed in a manner to enable the same to function as the secondary of an induction machine and the other circuit having a polyphase power connection with the primary winding of unlike pole number, and means for reversing the phase rotation of said power connection to change the frequency changer ratio of the machine.

5. A 25 to 60 cycle frequency changer comprising a stator member provided with two noninductive polyphase windings having pole numbers respectively equal to N and 1.4N, N being 10 or a multiple thereof, and a cooperating rotor member having an induction secondary winding circuit of a pole number equal to N and a polyphase alternating current winding circuit of a pole number equal to 1.4N and polyphase power connection between said last mentioned circuit and the N pole stator winding such that the phase rotations thereof are in the same direction.

6. A frequency changer comprising a primary member provided with two noninductively related polyphase windings having a pole number difference equal to 4 or a multiple thereof, and a cooperating secondary member provided with two noninductively related polyphase windings having pole numbers respectively equal to the pole numbers of the primary windings, one of the windings of said secondary member being closed to form an induction secondary with respect to the primary winding of like pole number and the other winding on said secondary having a polyphase power connection with the primary winding of unlike pole number.

7. A frequency changer comprising a stator member provided with two noninductively polyphase windings of a pole number difference equal to 4 or a multiple thereof and a cooperating rotor member provided with two noninductively related polyphase windings having pole numbers respectively equal to the pole numbers of said stator windings, one of said rotor windings being short circuited and the other of said rotor windings having a polyphase power connection with the stator winding of unlike pole number.

8. In combination, two alternating current systems of different frequency, a frequency converter connected between said systems comprising a primary member having two noninductively related windings having a pole number difference equal to 4 or a multiple thereof respectively connected to said systems and a cooperating secondary member having a winding system with two noninductively related alternating current circuits with pole numbers respectively equal to the pole numbers of the primary windings, one of said circuits being closed to form an induction secondary with respect to the primary winding of like pole number and a power connection between the other circuit and the primary winding of unlike pole number.

9. In combination, a 60 cycle alternating current system, and a 25 cycle alternating current system, and a frequency changer tie between said systems comprising a primary member provided with two noninductively related windings respectively connected to said systems and a cooperating secondary member having a winding system with two noninductively related alternating current circuits with pole numbers respectively equal to the pole numbers of said primary windings one of said circuits being closed to form an induction secondary with respect to the primary winding of like pole number and a power connection between the other circuit and the primary winding of unlike pole number, such that the phase rotation of said circuit and winding are the same, the ratio of pole numbers of the two primary windings connected to the 25 and 60 cycle systems being equal to $\frac{5}{7}$.

10. In combination, a polyphase 60 cycle system and a polyphase 25 cycle system and a frequency changer tie between said systems comprising cooperating stator and rotor members, said stator member having a 10 pole polyphase winding connected to the 25 cycle system and a 14 pole polyphase winding connected to the 60 cycle system, said rotor member having a 10 pole induction secondary winding and a 14 pole polyphase winding, the latter having a power connection with the 25 cycle system with a phase rotation similar to that of the 10 pole stator winding, the 10 and 14 pole windings being noninductive with respect to each other.

In witness whereof, I have hereunto set my hand this 7th day of February, 1924.

JOHN I. HULL.